(12) United States Patent
Chen et al.

(10) Patent No.: US 6,286,480 B1
(45) Date of Patent: Sep. 11, 2001

(54) REDUCED EMISSIONS ELEVATED ALTITUDE DIESEL FUEL INJECTION TIMING CONTROL

(75) Inventors: Gong Chen, Erie, PA (US); Bertrand Dahung Hsu, San Jose, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/389,742

(22) Filed: Sep. 7, 1999

Related U.S. Application Data

(60) Provisional application No. 60/108,535, filed on Nov. 16, 1998.

(51) Int. Cl.[7] ............................. F02M 37/04; F02D 7/00
(52) U.S. Cl. ........................ 123/380; 123/500; 123/501
(58) Field of Search ................................... 123/380, 478, 123/488, 500–501

(56) References Cited

U.S. PATENT DOCUMENTS

| | | | |
|---|---|---|---|
| Re. 34,803 | * 12/1994 | Chasteen | 123/480 |
| 4,469,066 | * 9/1984 | Yuzawa | 123/380 |
| 4,901,701 | * 2/1990 | Chasteen | 123/478 |
| 5,284,116 | * 2/1994 | Richeson, Jr. | 123/480 |
| 5,446,665 | * 8/1995 | Adrian et al. | 123/486 |
| 5,494,018 | * 2/1996 | Black et al. | 123/478 |
| 5,630,402 | 5/1997 | Devine et al. | |
| 5,809,954 | 9/1998 | Devine et al. | |
| 5,813,374 | * 9/1998 | Chasteen | 123/73 C |
| 5,848,582 | * 12/1998 | Ehlers et al. | 123/486 |

* cited by examiner

Primary Examiner—Thomas N. Moulis
(74) Attorney, Agent, or Firm—Carl A. Rowold; Jill M. Breedlove

(57) ABSTRACT

A fuel injection timing control system for diesel engines operating at high altitude includes a barometric sensor coupled to an altitude timing controller, and a throttle position sensor coupled to the engine and the altitude timing controller. The altitude timing controller adjusts fuel injection timing in response to the sensed pressure and sensed throttle position by advancing or retarding fuel injection timing by predetermined values as barometric pressure and/or throttle position changes. The predetermined values are selected to reduce exhaust emissions and/or increase engine efficiency and performance under various barometric pressure conditions so that the engine may be operated continually and optimally under various barometric conditions.

8 Claims, 3 Drawing Sheets

REDUCED EMISSIONS ELEVATED ALTITUDE DIESEL FUEL INJECTION TIMING CONTROL

CROSS-REFERENCE TO RELATED APPLICATIONS

This application claims the benefit of U.S. provisional application No. 60/108,535, filed Nov. 16, 1998.

BACKGROUND OF THE INVENTION

This invention relates generally to diesel engines and, more particularly, to medium speed diesel engines for operation at high altitudes.

Power is generated in a diesel engine by diffusing and combusting diesel fuel in a plurality of engine cylinders. Liquid fuel is injected into the engine cylinders full of compressed air at high temperature. The fuel is broken up into droplets, which evaporate and mix with the air in the cylinders to form a flammable mixture. Complete and efficient combustion in the cylinders requires full oxidation of fuel though evaporation, species diffusion, and mixing with air, and timely heat release during the combustion process. Thus, the amount of cylinder-charged air, or air to fuel ratio of the mixture, plays an important role in diesel engine fuel-air mixing and combustion, which, in turn affects fuel efficiency and exhaust emissions. This is particularly true for quiescent chamber type medium speed heavy-duty diesel engines where the cylinder air intake swirling is slight, such as locomotive or marine type engines having cylinders with relatively large displacement volumes. The fuel injection timing of medium speed diesel engines operating at full load is typically set so that the actual peak firing pressure in the cylinders is at or below a maximum cylinder filing pressure under normal altitude operation, i.e., at about sea level.

Engine exhaust emissions, including carbon monoxide (CO), particulate matters (PM) and smoke, are generated when the air-fuel mixture is incompletely combusted. When engines are operated at higher altitudes, i.e., at a low barometric pressure, lesser amounts of air are introduced into the cylinders, causing the air-fuel mixing process to be deteriorated relative to lower altitude, higher ambient pressure environments. This combination of factors increases late and incomplete combustion in the engine cylinders which lowers fuel efficiency and increases exhaust emissions of CO, PM, and smoke. The reduced amount of air for the fuel-air mixture combustion, together with the increased late and incomplete combustion, typically leads to reduced peak cylinder firing pressure and increased cylinder exhaust gas temperatures. For engines including a turbocharger, the decreased barometric pressure and the increased exhaust temperature cause an increase in turbocharger speed. This usually requires power deration to prevent turbocharger damage from overheating and excessive speed.

Accordingly, it would be desirable to operate a diesel engine at higher altitudes that avoids the resultant increase in exhaust emissions. Additionally, it would be desirable to operate a diesel engine at higher altitudes with minimal deterioration of engine efficiency, power capacity, and engine performance relative to normal altitude operation.

BRIEF SUMMARY OF THE INVENTION

In an exemplary embodiment of the invention, a fuel injection system for a diesel engine having at least one fuel injection pump and at least one fuel injector connected to at least one engine cylinder includes a fuel injection controller, a throttle position sensor and a barometric pressure sensor. The barometric pressure sensor is in fluid communication with an engine air supply, i.e., the air surrounding the engine, and is connected to the fuel injection controller. The barometric pressure sensor supplies a barometric pressure signal to the fuel injection controller, which then adjusts the fuel injection timing by controlling the fuel injection pump and the fuel injector accordingly to advance or retard fuel injection timing to reduce untimely and incomplete combustion in the engine cylinders. Engine efficiency may therefore be optimized and/or exhaust emissions reduced when the engine is operated at higher altitudes at a desired speed and power determined by a selected throttle position.

The fuel injection controller is an electronic controller, such as a microprocessor having a table, or tables, of predetermined fuel injection timing values that have been found to minimize exhaust emissions while optimizing steady state engine operation under the corresponding barometric pressure without exceeding a maximum peak firing pressure in the engine cylinders. Thus, the engine may be continuously and optimally operated under varying pressure conditions while minimizing exhaust emissions and maintaining optimum engine performance. As exhaust emissions are reduced and combustion in the cylinders is more timely and complete, engine power deration due to turbocharger overspeed is largely avoided.

DETAILED DESCRIPTION OF THE INVENTION

Figure 1:
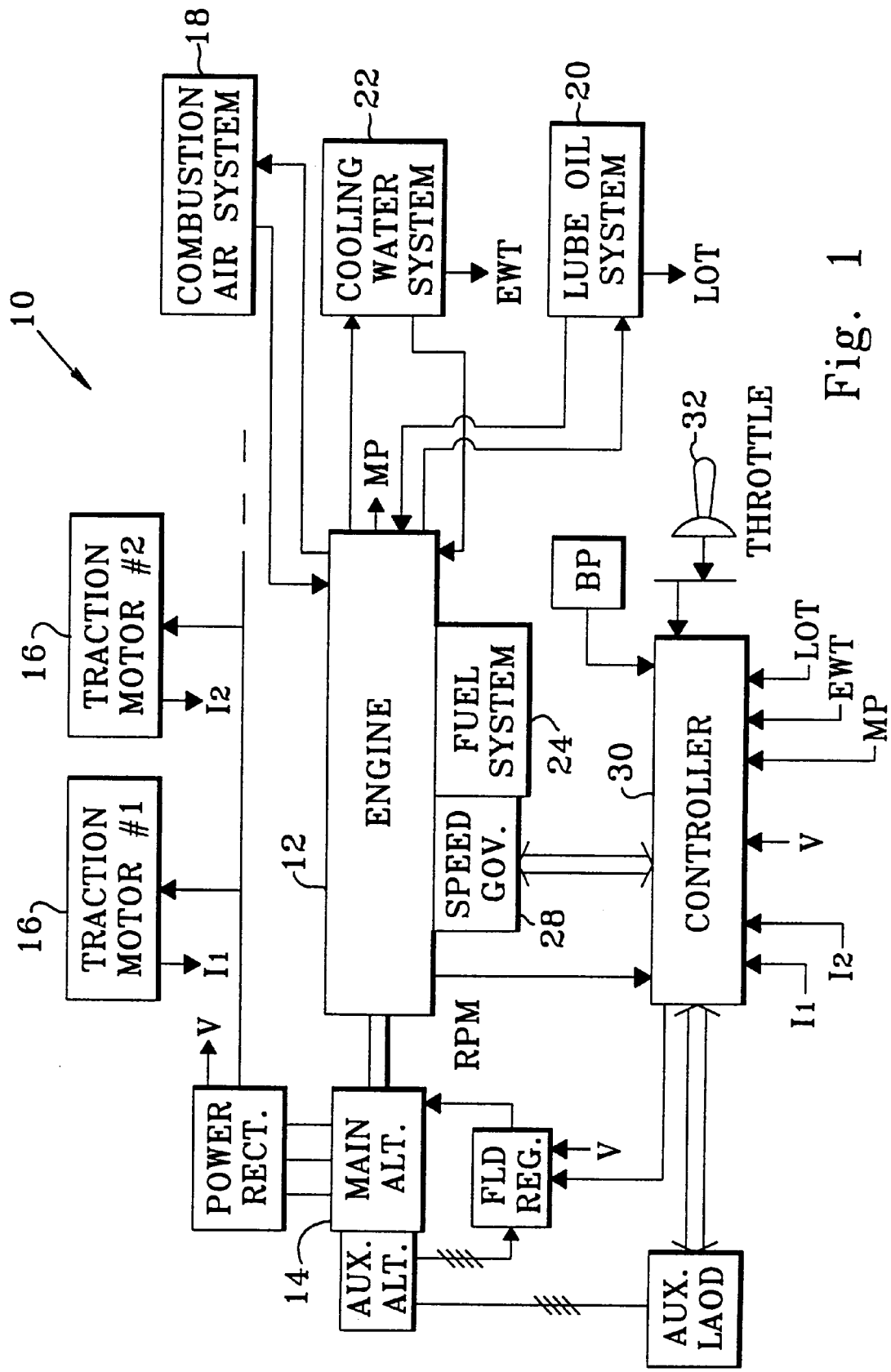
FIG. 1 is a schematic diagram of a diesel engine system.

FIG. 1 is a schematic illustration of a propulsion system 10 including a diesel engine 12. Particularly, and in an exemplary embodiment, system 10 is a self propelled locomotive (not shown). Engine 12 is mechanically coupled to a rotor of a main alternator 14 to power a plurality of traction motors 16 that are positioned on each side of an axle (not shown) of the locomotive to propel the locomotive. While the present invention is described in the context of a locomotive, it is recognized that the benefits of the invention accrue to other applications of diesel engines, and to other varieties of diesel engines beyond that specifically described. Therefore, this embodiment of the invention is intended solely for illustrative purposes and is in no way intended to limit the scope of application of the invention.

Engine 12 is a high horsepower, turbocharged, multiple-cylinder diesel engine, and includes a number of ancillary systems, such as a combustion air system 18, a lube oil system 20, a cooling water system 22, and a fuel system 24. Combustion air system 18 includes an engine exhaust gas-driven turbocharger (not shown in FIG. 1) for compressing air in a combustion air manifold of engine 12. Lube oil system 20 includes an oil pump and associated piping (not shown in FIG. 1) for supplying suitable lubricating oil to the various moving parts of engine 12. Cooling water system 22 includes a pump (not shown in FIG. 1) for circulating relatively cool water from one or more air cooled radiators (not shown in FIG. 1) to a lube oil cooler (not shown in FIG. 1), to a plurality of cylinder liners (not shown in FIG. 1) of engine 12 for absorbing heat generated in the combustion process, and also to one or more "intercoolers" (not shown in FIG. 1) through which combustion air passes after being compressed, and therefore heated, by the turbocharger.

Fuel system 24 includes a fuel tank (not shown in FIG. 1), fuel injection pumps (not shown in FIG. 1), and fuel injector nozzles (not shown in FIG. 1) for injecting diesel fuel into a plurality of power cylinders (not shown in FIG. 1). A fuel pump controller 28 controls the start of and duration of fuel flow into each of the cylinders. In a mechanically fuel injected engine, controller 28 is a governor controller linked to fuel injection pump racks (not shown in FIG. 1) to control the start of and duration of fuel flow into an engine cylinder upon each actuation of the respective fuel injectors. In an electronically fuel injected engine, the controller is an electronic controller connected to electrically actuated valves in the fuel pump to control when and for how long fuel flows into a cylinder upon actuation of an associated fuel injector. Controller 28 regulates engine speed by minimizing any difference between a desired speed and an actual operating speed. The desired speed is set by a variable speed control signal received from an engine controller 30 in response to a manually or automatically selected position or input of a throttle 32 according to defined speed-load schedules.

Figure 2:
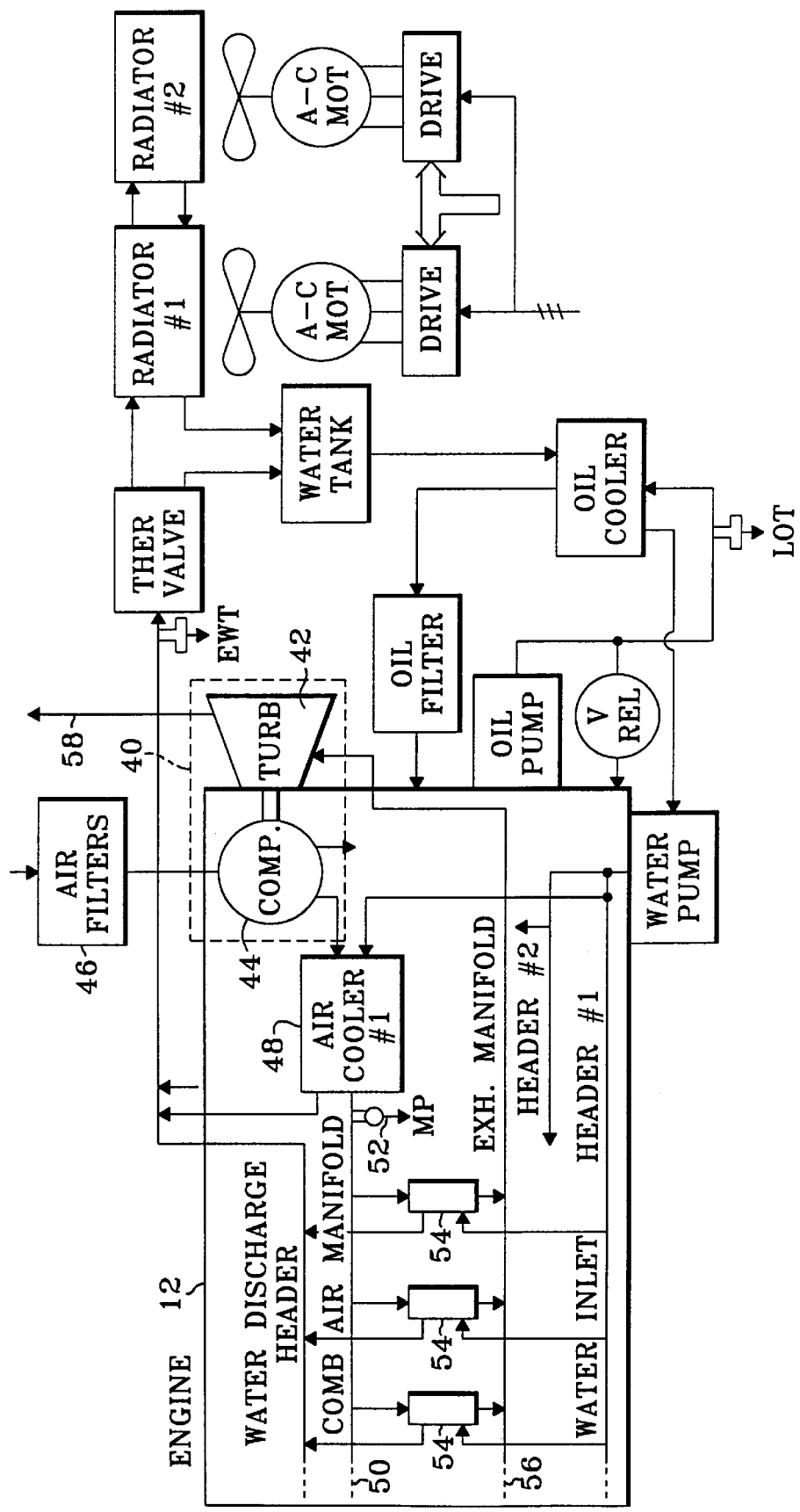
FIG. 2 is a simplified schematic diagram of the system shown in FIG. 1.

FIG. 2 is a schematic illustration of exemplary diesel engine 12. A turbocharger 40 in combustion air system 18 (FIG. 1) includes a turbine 42, the output of which drives a centrifugal air compressor 44. Clean air is collected in a plenum (not shown in FIG. 2), passed through an array of air filters 46, and delivered to a central inlet of compressor 44 and discharged from compressor 44 at elevated temperature and pressure to an air-water heat exchanger 48 known as an aftercooler or intercooler. From intercooler 48, compressed air passes into a combustion air manifold 50. Compressed air is supplied to power cylinders 54 from combustion air manifold 50.

Gases produced during combustion are exhausted from each of the power cylinders into an exhaust manifold 56. The exhaust gases drive the rotor of turbine 42 prior to their discharge through an exhaust stack 58 to the atmosphere. Turbine 42 speed typically increases as engine 12 develops more power. With engine running at or near full power, compressor 44 compresses combustion air to more than twice atmospheric pressure. One or more intercoolers 48 lower the temperature of the compressed air (which was heated appreciably during the compression process), thereby enlarging the amount of air charge by filling the cylinders with higher density air, and lowering the thermal loading of engine 12.

Hot engine oil is pumped by an oil pump 60 to an inlet of an oil-water heat exchanger 64, and cooled oil flows from oil-water heat exchanger 64 through an oil filter 66 and to an oil supply header (not shown in FIG. 2). Oil is distributed from the supply header to various bearings, valves, pistons, gears, and other moving parts (not shown in FIG. 2) of engine 12 for lubricating and/or cooling purposes. A thermistor 72 is exposed to oil flowing in pipe 62 near an inlet of the oil cooler.

Cooling water system 22 comprises a water storage tank 74 from which relatively cool water flows, via heat exchanger tubes inside oil cooler 64, to a water pump 76. Water pump 76 raises the pressure of the water which flows through cylinder jackets of cylinders 54 to a common water discharge header 80. Cooling water is also pumped through intercooler 48 (not shown) to extract heat from the elevated temperature combustion air discharged from compressor 44. The system is balanced hydraulically so that the flow rate to one or more intercoolers is in a desired flow rate to the cylinder jackets.

Hot water leaving the engine from discharge header 80 flows through at least one fluid valve 86. Fluid valve 86 is typically coupled to a thermistor that diverts water to water storage tank 74 when the temperature of the water in valve 86 is below a predetermined temperature or when the water pressure is below a predetermined pressure. When cooling water is above a predetermined temperature, or above a predetermined pressure, water flows into one or more water-air heat exchangers, or radiators 94. After being cooled in radiators 94, water is discharged into water tank 74.

Figure 3:
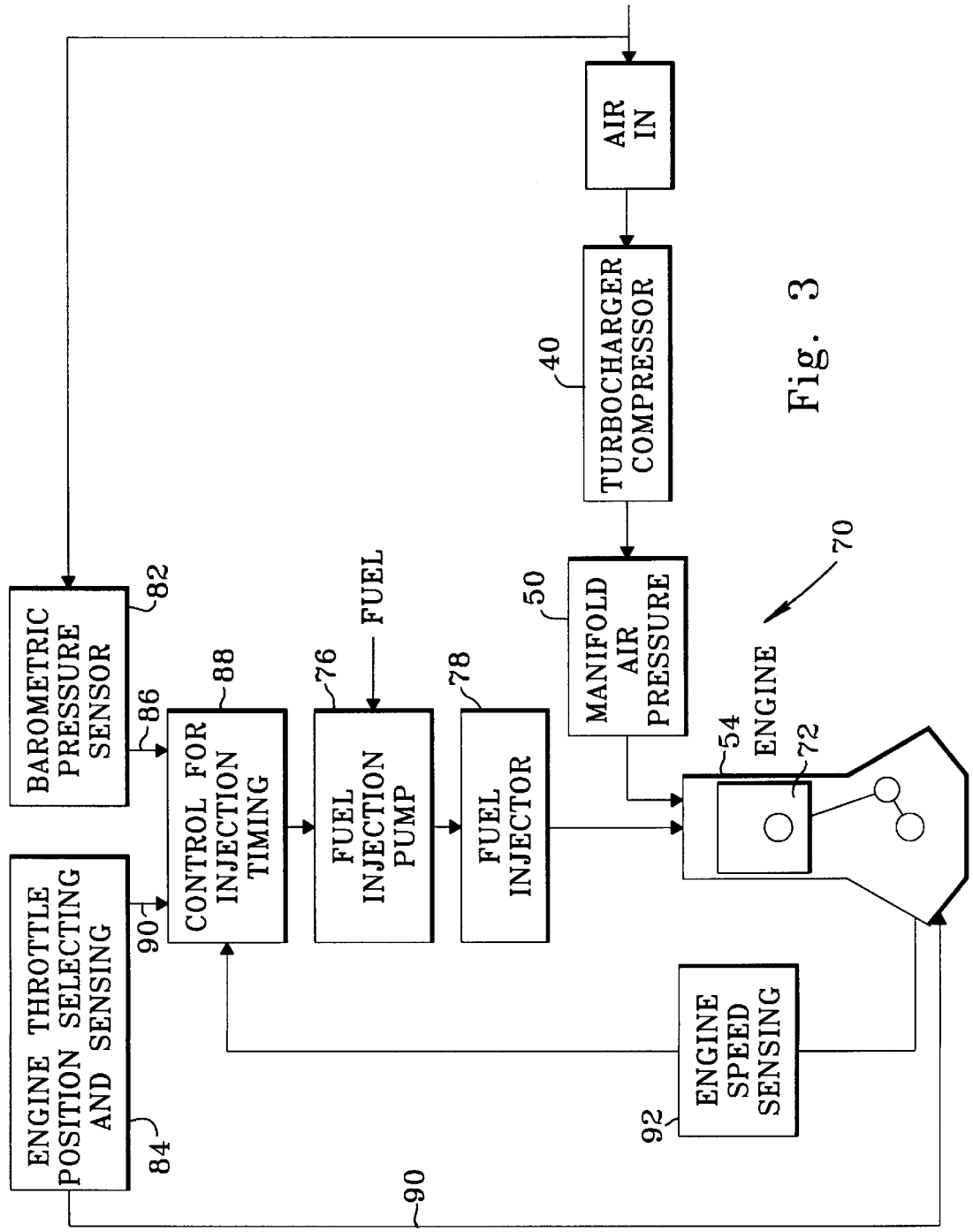
FIG. 3 is a schematic diagram of a control system for the engine shown FIG. 2.

FIG. 3 schematically illustrates a control system 70 for exemplary engine 12 including a plurality of pistons 72 operating in a plurality of cylinders 54. A fuel injection pump 76 and a fuel injector 78 are operable to inject fuel into each cylinder 54 for combustion to produce energy for driving pistons 72 in a downward direction. As the fuel is injected, it is mixed with cylinder-compressed air in each cylinder 54 supplied by combustion air manifold 50 and turbocharger 40. Air is supplied to turbocharger 40 through an appropriate air intake unit (not shown) that includes air filters 46 (FIG. 2) to filter particulate matter from the air.

Fuel injection pump 76 and fuel injector 78 are controlled by an altitude timing controller 88 to control fuel injection timing, i.e., when fuel injection into cylinders 54 begins. Altitude timing controller 88 is integral with controller 28 (shown FIG. 1), a discrete component of engine controller 30 (shown in FIG. 1), or a separate controller operating cooperatively with controllers 28 and 30. Altitude timing controller 88, by altering fuel injection timing at the corresponding engine throttle input or throttle position, reduces exhaust emissions and increases engine efficiency at higher altitudes, i.e., at low barometric pressure.

A barometric pressure sensor 82 is coupled to altitude timing controller 88 and positioned to reliably sense a barometric pressure of the engine air supply, i.e., the air surrounding the engine, at a location free from turbulence or pressure effects due to engine operation. A barometric pressure signal 86 is supplied to altitude timing controller 88 from barometric pressure sensor 82 for adjusting operation of fuel injection pump 76 and fuel injector 78 to reduce exhaust emissions, enhance engine efficiency, and maintain engine power capacity at higher altitudes. Altitude timing controller 88 includes a microcomputer (not shown) and electronic controls (not shown) known in the art.

At least one throttle position sensor 84 is connected to engine 12 and to an engine input, such as throttle 32 (FIG. 1), to assess the selected engine throttle position, or the desired speed and load of the engine. A throttle position signal 90 is supplied to a loading device, such as an alternator (not shown) mechanically coupled to the engine to generate a desired engine power corresponding to the selected throttle position. Fuel injection controller 88 controls fuel injection timing by operating fuel injection pump 76 and fuel injector 78 to begin fuel injection at an optimal time in the injection cycle in response to the sensed barometric pressure and throttle position.

Barometric pressure of the engine air supply is monitored by control system 70 to distinguish high altitude from normal altitude operation, and altitude timing controller 88 adjusts fuel injection timing as a function of barometric pressure and throttle position to compensate for reduced cylinder air to fuel ratios at elevated altitudes. Therefore, exhaust emissions can be reduced, and engine performance comparable to normal altitude performance is achieved.

If a low barometric pressure representing a high altitude is detected, fuel injection timing is advanced, i.e., fuel injection starts at an earlier point in time in the piston cycle, according to a predetermined value selected from a table, or tables, of fuel injection timing values stored in memory of altitude timing controller 88 and corresponding to the sensed barometric pressure and engine speed and load, which is dictated by throttle position. Because engine speed 92 and the amount of fuel to be injected at each injection cycle to maintain the desired engine speed and power is dictated by the throttle position, an optimum fuel injection timing value can be selected based on the barometric pressure and throttle position. Of course, other known indicators of engine speed and load may be used to select a fuel injection timing value. If necessary, or as desired controller 88 may interpolate between values in the table(s) to calculate a desired fuel injection timing value, or to fine tune fuel injection timing.

Each of the stored fuel injection timing values minimize exhaust emissions and/or optimize engine efficiency while preventing cylinder pressures above allowable peak firing pressure in cylinders 54. By advancing fuel injection timing by the predetermined value, the peak firing pressure of cylinder 54 is increased to be closer to the designed maximum allowable peak firing pressure of the cylinder during high engine loads at higher altitudes so that engine 12 generates sufficient power. Also, as a result of the fuel injection timing being advanced, the air-fuel mixing is prolonged to allow a more complete and timely combustion with an improved timeliness of heat release. Further, as untimely and late combustion is reduced, exhaust emission temperatures are reduced. Consequently, the speed of turbocharger 40 is reduced and the need for power deration to prevent turbocharger damage is minimized.

As barometric pressure changes, altitude timing controller 88 adjusts fuel injection timing accordingly so that engine 12 may be continuously operated under different pressure conditions with minimal deterioration of engine performance. Thus, fuel injection timing is advanced from normal altitude values during high elevation operation, and retarded or returned to normal altitude values when engine 12 is returned to normal altitude. Of course, the same principles can be applied to operate engine 12 and maintain peak firing pressure at or below the maximum allowable pressure value when operating an engine at or below sea level. Fuel injection timing can be adjusted by altitude timing controller 88 either continuously with changes in sensed barometric pressure, or in steps with specified levels of pressure change. For example, altitude timing controller 88 may adjust fuel injection timing when barometric pressure increases or decreases by two pressure units from a given operating pressure.

At lower engine loads in high altitude operation, fuel injection timing is adjusted by controller 88 to optimize steady state operation of engine 12. More specifically, advancing the fuel injection timing has significant benefits at lower engine loads because turbocharger 40 is relatively sluggish. When the engine operates under partial load, the turbocharger turbine 42 (shown in FIG. 2) rotates slower than when engine 12 operates at full load. Consequently, turbocharger turbine 42 (FIG. 2) does not rotate as fast, so less pressure is developed in cylinders 54 and the deterioration of exhaust emissions is more pronounced. Because of the relatively low cylinder firing pressure at lower engine loads, exceeding a maximum firing pressure by adjusting the fuel injection timing advance is of little practical concern. Thus, the injection timing can be freely set for optimum emissions and/or fuel efficiency performance for a given air supply pressure and engine throttle position. Based on the sensed barometric pressure and throttle position, altitude timing controller 88 selects fuel injection timing values from predetermined values stored in altitude timing controller memory and found to achieve optimum fuel efficiency and/or emissions reductions without exceeding maximum peak allowable firing pressure in cylinders 54 for a given engine speed and engine load.

Thus, a diesel engine fuel injection timing control is provided that allows for optimal engine efficiency and performance with reduced emissions despite changes in barometric pressure.

While the invention has been described in terms of various specific embodiments, those skilled in the art will recognize that the invention can be practiced with modification within the spirit and scope of the claims.

What is claimed is:

1. A fuel injection control system for a medium-speed compression ignition diesel engine for powering a railroad locomotive, the engine including at least one power cylinder, at least one fuel injection pump and at least one fuel injector connected to said fuel injection pump for injecting fuel into said at least one cylinder, said fuel injection control system comprising:

an altitude timing controller connected to said fuel injection pump and fuel injector, said altitude timing controller being programmed to advance ignition timing upon an increase in altitude to increase peak firing pressure in said at least one cylinder to a pressure near the design maximum firing pressure to maintain a desired engine power output, by advancing the time at which to begin fuel injection into the cylinder; and a barometric pressure sensor coupled to said altitude timing controller, to provide a signal indicative of increased altitude to said altitude timing controller.

2. A fuel injection control system in accordance with claim 1 further comprising an engine speed and load sensor, said altitude timing controller adjusting said fuel injection timing in response to a desired engine speed and load signal from said speed and load sensor.

3. A fuel injection control system in accordance with claim 2, wherein the engine includes a throttle input selectively operable between a plurality of throttle positions, said speed and load sensor comprising a throttle position sensor coupled to said altitude timing controller and coupled to said throttle input for sensing a throttle position.

4. A fuel injection control system in accordance with claim 3 wherein said controller comprises a microprocessor and a memory, said memory loaded with predetermined fuel injection timing values for a range of barometric pressures and throttle positions.

5. A fuel injection control system in accordance with claim 4 wherein said fuel injection timing values are predetermined so that an actual peak firing pressure in the cylinders is at or below a maximum allowable firing pressure for the cylinders when each of said fuel injection timing values is implemented under the corresponding barometric pressure and throttle positions.

6. A fuel injection control system for a medium-speed compression ignition diesel engine for powering a railroad locomotive, the engine including at least one power cylinder, at least one fuel injection pump, a throttle input selectively operable among a plurality of discrete throttle positions, and at least one fuel injector connected to said fuel injection pump for injecting fuel into said at least one cylinder, said fuel injection control system comprising:

an altitude timing controller connected to said fuel injection pump and fuel injector, said altitude timing controller being programmed to advance ignition timing upon an increase in altitude, dependent upon the throttle position, to increase peak firing pressure in said at least one cylinder to a pressure near the design maximum firing pressure to maintain a desired engine power output, by advancing the time to begin fuel injection into the engine;

a throttle position sensor coupled to said altitude timing controller and coupled to said throttle input for sensing a discrete throttle position and for generating a discrete throttle position signal for transmission to the altitude timing controller; and a barometric pressure sensor coupled to said altitude timing controller, to provide a signal indicative of increased altitude to said altitude timing controller.

7. A fuel injection control system in accordance with claim 6 wherein said controller comprises a microprocessor and a memory, said memory loaded with predetermined fuel injection timing values for a range of barometric pressures and throttle positions.

8. A fuel injection control system in accordance with claim 7 wherein said fuel injection timing values are predetermined so that an actual peak firing pressure in the cylinder is at or below a maximum allowable firing pressure for the cylinder when each of said fuel injection timing values is implemented under the corresponding barometric pressure and throttle positions.

* * * * *